(12) United States Patent
Lewis

(10) Patent No.: US 9,392,430 B2
(45) Date of Patent: Jul. 12, 2016

(54) BONDING OF RECEIVER TO CAMERA BASED MOBILE DEVICE HAVING CONNECTIVITY

(75) Inventor: Richard Lewis, Buffalo Grove, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 344 days.

(21) Appl. No.: 13/093,215

(22) Filed: Apr. 25, 2011

(65) Prior Publication Data

US 2012/0270509 A1 Oct. 25, 2012

(51) Int. Cl.
*H04B 7/00* (2006.01)
*H04W 4/20* (2009.01)

(52) U.S. Cl.
CPC .......... *H04W 4/206* (2013.01); *G08C 2201/20* (2013.01); *G08C 2201/93* (2013.01)

(58) Field of Classification Search
USPC ........................... 455/41.2; 348/734, E7.024
See application file for complete search history.

(56) References Cited

U.S. PATENT DOCUMENTS

| 7,912,426 | B2 * | 3/2011 | Masera et al. | 455/41.2 |
| 8,423,163 | B2 * | 4/2013 | Park | 700/83 |
| 2007/0258718 | A1 * | 11/2007 | Furlong | G08C 17/02 398/106 |
| 2009/0291638 | A1 * | 11/2009 | Sugaya et al. | 455/41.2 |
| 2011/0055075 | A1 * | 3/2011 | Saurat | 705/39 |
| 2012/0178368 | A1 * | 7/2012 | Fleck et al. | 455/41.2 |

* cited by examiner

*Primary Examiner* — Ping Hsieh

(57) ABSTRACT

A mobile device is bonded to a controllable device by reading a code on the controllable device, banding the mobile device to the controllable device by use of the code, and transmitting a remote control signal from the mobile device to control a controllable function of the bonded controllable device so that only the bonded controllable device responds to the remote control signal by performing the controllable function.

18 Claims, 1 Drawing Sheet

BONDING OF RECEIVER TO CAMERA BASED MOBILE DEVICE HAVING CONNECTIVITY

TECHNICAL FIELD

The method and/or apparatus disclosed herein relates to a mobile device, having both a camera and connectivity, configured so that the mobile device can be used as a remote control for singularly controlling a receiver, such as television.

BACKGROUND

Application programs (referred to below more simply as application(s)) for cell phones such as smartphones are now available that allow users to use their cell phones as remote controls for remotely controlling televisions, personal computers, and other devices. A cell phone configured as a remote control by such an application can be used to change channels, adjust volume, transfer data such as video from the cell phone to the television or from the television to the cell phone, to remotely program a DVR, to remotely control selected software on a PC, to remotely shutdown a PC, etc. In one form, these applications permit the display of the cell phone to emulate the buttons of a more conventional remote control.

Also, QR (Quick Response) Codes are now in use. A QR Code is a specific matrix barcode (or two-dimensional code), readable by dedicated QR Code readers and mobile devices, such as cell phones, with cameras. A QR Code typically consists of black modules arranged in a square pattern on a white background. The information encoded can be text, a URL, or other data.

QR codes are currently used in connection with television in a way that makes the relationship between viewer and television interactive. For example, QR codes are currently used in television programming, allowing users to read the codes with their cell phones and, using the information encoded in the code, connect through the Internet to web sites for accessing additional information. Thus, inter alia, the user can access a supplier's website based on a QR code embedded in advertising carried in television ads or other programming.

QR Codes are also being used to uniquely identify individual televisions so that each television in a facility such as a hotel or motel can be distinguished by its QR Code from all other televisions in the facility.

Disclosed herein is a novel bonding between a camera based mobile device having connectivity and a receiver, such as a television, using a code, such as a QR Code, uniquely identifying that receiver.

DETAILED DESCRIPTION

Figure 1:
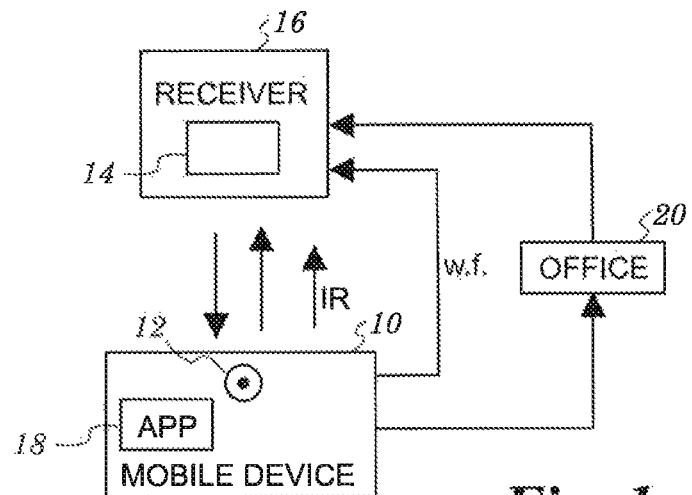
FIG. 1 illustrates a system in which a cell phone uniquely interacts with a television; and, FIG. 2 illustrates an application uniquely and individually bonding the cell phone to the television.

As shown in FIG. 1, a mobile device 10, such as a smartphone or other wireless phone, is capable of executing applications, and includes camera 12 that can read a code 14, such as a QR code, on a receiver 16. The mobile device 10 also has connectivity so that it can make calls, or connect to the Internet, or other transmit wireless or wired signals. The receiver 16, for example, may be a television. The code 14 includes an address uniquely identifying the receiver 16 and is displayed such as on the chassis of the receiver 16, or on an initial screen of the receiver 16 at turn on in the case where the receiver 16 is a television, or in a transmission from the receiver 16, or etc.

The mobile device 10 includes one of the existing remote control applications 18, such as a remote control television application, allowing the mobile device 10 to remotely control the receiver 16. Accordingly, the mobile device 10 transmits signals that remotely control the receiver 16 in the same or similar fashion as existing remote controls control televisions. These signals can be RF wireless signals, IR wireless signals, wired signals, etc. In the case of wired signals, the wired signals can go to a central office 20 first and then from the central office 20 back to the television 16. Other variations are possible.

Because the receiver 16 is provided with the code 14, the mobile device 10 can be uniquely bonded to the receiver 16 so that only the receiver 16 and no other receiver responds to the remote control signals transmitted by the mobile device 10. In order to bond the mobile device 10 to the receiver 16, an application 30 represented by the flow chart of FIG. 2 is loaded into the mobile device 10.

Figure 2:
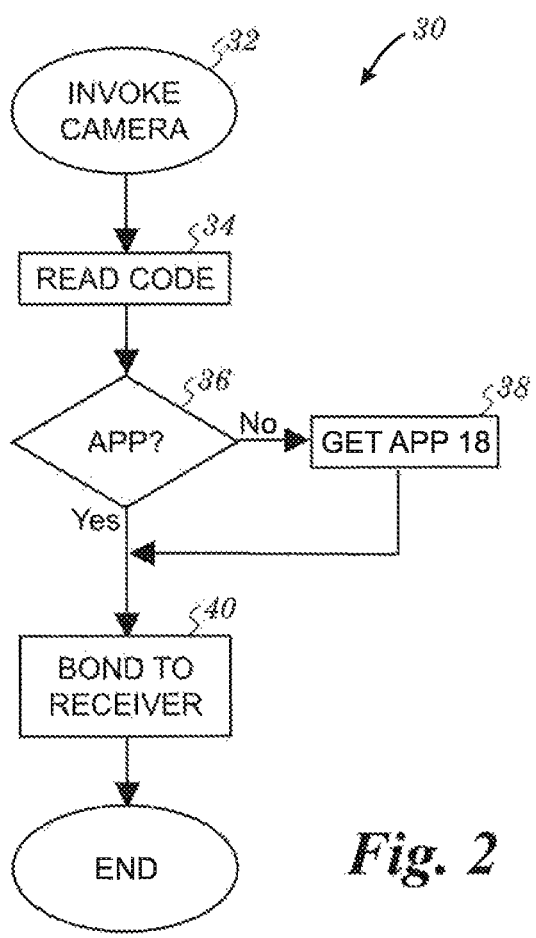

As shown in FIG. 2, when the user selects the application 30, the user starts the bonding process by invoking the camera at 32 so as to acquire an image at 34 of the code 14 from the receiver 16. The application 30 then determines at 36 whether the mobile device 10 has the remote control application 18. If the cell phone 10 does not already have the remote control application 18 among its stored and executable applications, the application 30 at 38 acquires the remote control application 18, such as by connecting to the Internet and downloading the remote control application 18 to the mobile device 10.

After the application 30 at 38 acquires the remote control application 18, or if the mobile device 10 already has the remote control application 18 as determined at 36, the application 30 at 40 bonds the mobile device 10 to the receiver 16 so that only the receiver 16 and no other receiver responds to remote control signals from the mobile device 10.

Thus, at 40, the application 20 decodes the code 14 in order to determine the address of the receiver 16, and modifies the remote control application 18, which it acquired at 38 or which it determined at 36 to be already resident on the mobile device 10, so that all future remote control communications from the mobile device 10 to the receiver 16 includes the address of the receiver 16.

In this way, the receiver 16 determines whether any remote control communications that it receives contain its address. The receiver 16 responds to those remote control communications that contain its address and ignores all other remote control communications. Thus, the mobile device 10 may be used to remotely control the receiver 16 to which it has bonded but does not remotely control other receivers that happen to be within transmission range of its remote control communications.

This bonding is especially useful in facilities such as hotels and motels having a number of remotely controlled televisions in relatively close proximity.

Certain modifications of the present invention have been discussed above. Other modifications will occur to those practicing in the art of the present invention. For example, the term "mobile device" is used herein to connote any device that can read a code from a receiver such as a television, has connectivity to other devices, that has a camera, and that can execute applications.

Also, as described above, the code 14 can be a QR Code. However, the bar code can be other types of codes such as a more traditional bar code.

Further, as described above, the mobile device 10 is bonded to the receiver 16 which is a television as shown. However, the mobile device 10 may be bonded to other devices such as computers.

Moreover, as described above, the applications 18 and 30 are separate applications. Instead, the applications 18 and 30 may be the same application.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of operating a mobile device, comprising:
providing a plurality of receivers within a facility, each of the plurality of receivers being responsive to same remote control signals for remote control of the respective receiver, and each of the plurality of receivers having a respective code different from a respective code of the other receiver or receivers, wherein each code comprises a unique address of the respective receiver different than unique addresses of the other one or more receivers, said code of each receiver being readable by the mobile device, and each receiver recognizing said remote control signals for being responsive thereto only if the remote control signals include said unique address of the respective receiver;
providing the mobile device with a remote control function for transmitting said remote control signals that control each of the plurality of receivers and also with a reader for reading said codes;
with the mobile device, reading a respective code of a respective selected receiver of said plurality of receivers and based on said code determining said unique address of said selected receiver; and
based on said unique address for said selected receiver, transmitting a remote control signal such that the transmitted remote control signal is received by each of the plurality of receivers, the transmitted remote control signal including said unique address of said selected receiver with said remote control signals that control each of the plurality of receivers in order to remotely control only said selected receiver with the transmitted remote control code and not the other one or more receivers that receive the transmitted remote control code, the remote control of the selected receiver being performed with one way communication from the mobile device and without establishing two way communications between the mobile device and the selected receiver.

2. The method of claim 1 wherein the code comprises a QR Code.

3. The method of claim 1 wherein the mobile device has a remote control application.

4. The method of claim 1 wherein each of the receivers comprises a television and said unique address of said selected receiver included with said remote control signals are sent to each of said televisions by infra-red.

5. The method of claim 1 wherein the mobile device downloads a remote control application which is used for creating said remote control signals.

6. A method of claim 1 wherein said mobile device comprises a camera and said code on said selected receiver is captured by said camera.

7. The method of claim 1 wherein the receiver is a television and the code is displayed on a screen of the television.

8. The method of claim 1 wherein the receiver is a television and the code is displayed on the receiver.

9. The method of claim 1 wherein the mobile device transmits the unique address of the selected receiver and the remote control signals are sent to all of the receivers of the plurality of receivers via a central office first and then from the central office to each of the plurality of receivers.

10. A remote control system, comprising:
a mobile device for transmitting remote control signals;
a plurality of receivers within a facility, each of the plurality of receivers being responsive to same ones of said remote control signals of said mobile device for remote control of the respective receiver, and each of the plurality of receivers having a respective code different from a respective code of the other receiver or receivers, wherein each code comprises a unique address of the respective receiver different than unique addresses of the other one or more receivers, said code of each receiver being readable by said mobile device, and each receiver recognizing said remote control signals for being responsive thereto only if the remote control signals include said unique address of the respective receiver;
the mobile device having a remote control function for transmitting said remote control signals that control each of the receivers and also a reader for reading said codes;
said mobile device reading a respective code of a respective selected receiver of said plurality of receivers and based on said code said mobile device determining said unique address of said selected receiver; and
said mobile device, based on said unique address for said selected receiver, transmitting the remote control codes that control each of the receivers to all of the receivers of the plurality of receivers, the transmitted remote control codes including said unique address of said selected receiver with said remote control signals in order to remotely control only said selected receiver and not the other one or more receivers that receive the remote control signals from the mobile device, the remote control of the selected receiver being performed with one way communication from the mobile device and without establishing two way communications between the mobile device and the selected receiver.

11. The system of claim 10 wherein the code comprises a QR Code.

12. The system of claim 10 wherein the mobile device has a remote control application.

13. The system of claim 10 wherein each of the receivers comprises a television and said unique address of said selected receiver included with said remote control signals are sent to each of said televisions by infra-red.

14. The system of claim 10 wherein the mobile device downloads a remote control application which is used for creating said remote control signals.

15. A system of claim 10 wherein said mobile device comprises a camera and said code on said selected receiver is captured by said camera.

16. The system of claim 10 wherein the receiver is a television and the code is displayed on a screen of the television.

17. The system of claim 10 wherein the receiver is a television and the code is displayed on the receiver.

18. The system of claim 10 wherein the mobile device transmits the unique address of the selected receiver and the remote control signals are sent to all of the receivers of the plurality of receivers via a central office first and then from the central office to each of the plurality of receivers.

\* \* \* \* \*